United States Patent [19]

Yamazaki

[11] Patent Number: 5,307,489
[45] Date of Patent: Apr. 26, 1994

[54] SEEK SYSTEM FOR A MAGNETIC DISK APPARATUS

[75] Inventor: Shigeo Yamazaki, Ibaragi, Japan

[73] Assignee: NEC Corporation, Tokyo, Japan

[21] Appl. No.: 857,186

[22] Filed: Mar. 25, 1992

[30] Foreign Application Priority Data

Mar. 26, 1991 [JP] Japan ................................ 3-061716

[51] Int. Cl.⁵ ........................ G06F 13/10; G06F 11/30
[52] U.S. Cl. ............................ 395/650; 364/DIG. 1;
  364/236.2; 364/221.7; 364/260.1; 364/262.9;
  360/75
[58] Field of Search ................ 395/650, 425; 360/75,
  360/77.04, 78.11, 78.04

[56] References Cited

U.S. PATENT DOCUMENTS

| | | | |
|---|---|---|---|
| 4,697,213 | 9/1987 | Kitamura | 360/77 X |
| 5,150,266 | 9/1992 | Albert | 360/78.04 |
| 5,185,681 | 2/1993 | Volz et al. | 360/77.04 |
| 5,191,568 | 3/1993 | Muto et al. | 360/78.06 |

Primary Examiner—Thomas M. Heckler
Attorney, Agent, or Firm—Foley & Lardner

[57] ABSTRACT

In a magnetic disk processing apparatus, read command processing instructs reading data out to compare a physical address (PA) of data which has been read out with a PA being retained. If the addresses coincide with each other, then processing returns to a command executing operation and, if not, after a flag condition is ascertained by a flag determining operation, a seek command is issued for a PA being stored independently of the software. A flag indicates that a seek command, resulting from a mismatch of a comparison, has been completed and the processing returns to read command processing. In this manner, any seek error caused by a mismatch of seek address management which occurs between a seek command from software and a patrol seek is compensated for.

4 Claims, 4 Drawing Sheets (a)

(b)

SEEK SYSTEM FOR A MAGNETIC DISK APPARATUS

BACKGROUND OF THE INVENTION

1. Field of the Invention

The present invention relates to a seek system for a magnetic disk processing apparatus having a patrol seek function.

2. Prior Art

Conventionally, a magnetic disk apparatus having a patrol seek function has been controlled by a firmware such as a flowchart of a magnetic disk processing apparatus as shown in FIG. 1 (a) and FIG. 1 (b). FIG. 1 (a) illustrates a main routine in which the condition of the magnetic disk is monitorred and the timer control is carried out for patrol seeking by polling operation (step 311), and for each period of time, a patrol seek control operation carries out the control of the patrol seek (step 312). If the I/O operation (a command for executing a chain of software instructions) is activated (step 313), then the processing is shifted to a command fetch-/decode portion and, in accordance with the processing result therein, the command (software instruction) is actually executed by the command processing (steps 315 and 316). Then, after the chain of commands (hereinafter referred to as CC) is executed or a terminating operation is executed (steps 318 and 319) depending on whether the chain of commands (command chain) is present or not (step 317), the procedure is returned to the command processing or polling operation.

Next, FIG. 1 (b) illustrates a read command subroutine, which is part of the subroutine of the command execution shown in FIG. 1 (a). After a read command is issued to the magnetic disk apparatus in accordance with the read command processing (step 321), a physical address PA of data which has been read and a PA stored within the magnetic disk unit are compared with each other (step 32) and, if that result coincides with each other, then the command execution is continued and, if otherwise, an error processing is conducted.

In such a conventional magnetic disk processing unit, since the seek command is issued to the magnetic disk unit by patrol seeking independently of the command from the software, there occurs a mismatch between the PA of the magnetic disk unit, which is retained by the software and the magnetic disk processing unit, and the PA where the magnetic head actually lies, which, when the data of the magnetic disk unit is read from or written onto the magnetic disk unit in accordance with the command from the software, causes a track completely different from one of which the software is conscious (unit accessed by the magnetic disk unit which may be universally defined by the PA) to be accessed. In addition, in such a case, there is no method of determining by software whether the error has occurred due to the patrol seek or not and, depending on the case, a erroneous operation of the software can be incurred, which damages the system reliability.

SUMMARY OF THE INVENTION

Accordingly, an object of the present invention is to eliminate the above-described drawbacks and provide a seek system for a magnetic disk processing apparatus which allows a mismatch of the seek address management, which can occur between seeks by the seek command of software and patrol seek, to be eliminated.

According to the present invention, there is provided a method for controlling a magnetic disk apparatus having a patrol seek function to issue a command thereto to shift a magnetic head at predetermined time and distance intervals independently of a software command, the method including the steps of:

monitoring a condition of the magnetic disk and controlling a timer for patrol seeking to execute a pooling operation;

controlling a patrol for each predetermined period of time set by a timer set by the polling operation;

performing an I/O activation determining operation to determine whether or not an I/O activation, which is an instruction for executing a chain of software commands, is present;

initializing a flag indicating a condition in which a seek command is executed prior to execution of an I/O activation;

carrying out a fetch/decode operation of a software command according to determined results of the I/O activation determining operation; and executing an actual software command decoded by the fetch/decode operation.

In addition, the step of executing an actual software command may include the steps of:

reading data from the magnetic disk apparatus using software;

comparing a physical address of data read out from the magnetic disk apparatus by the reading data operation with a physical address indicating a position where the magnetic head is shifted in accordance with a seek command;

determining a condition of the flag when results of physical address comparing do not coincide with each other;

determining as an error operation if a result of a flag determining operation is set and issuing a seek command to a physical address being stored independently of the software command to correct a seek error if the result is reset; and setting a flag indicating that a seek operation has been completed by a seek command operation to return processing again to read command processing.

Still further, a branching operation of seek command processing is carried out by storing a cylinder number and a track number of a corresponding position as a physical address indicating an original position of the magnetic head after a seek operation is conducted in accordance with a seek command.

In addition, the above-described read command processing is carried out by determining the flag only when a first read command is issued, processing the seek command and resetting the flag after it is confirmed that the flag has been reset, and determining a period of time during which a following command chain continues to bypass seek command processing and flag set operations.

That is, according to the seeking system of the magnetic disk processing apparatus of the present invention, since, upon detection of the non-coincidence by the comparison of the PA, the seek command addressed to the physical address PA where the magnetic head is to be originally located can be executed independently of the software command by the magnetic disk processing apparatus, the mismatch between the movement of the magnetic head by the patrol seeking and the PA management by software can be eliminated to ensure the reliability of the system. Next, the present invention is described with reference to the accompanying drawings.

DETAILED DESCRIPTION OF THE PREFERRED EMBODIMENTS

Figure 1:
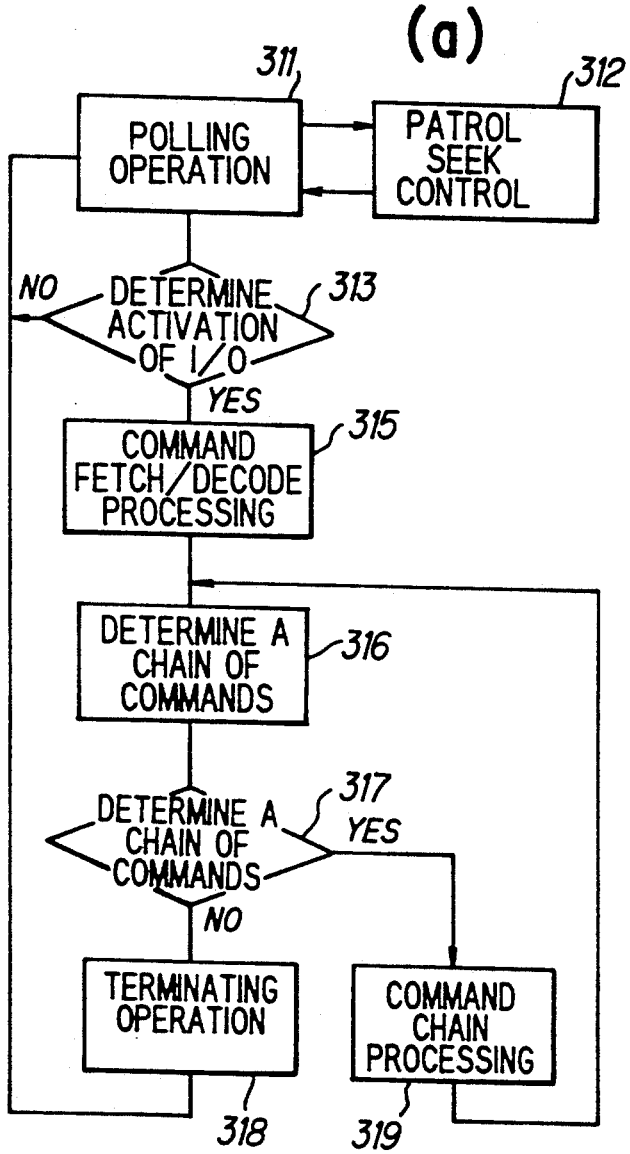
FIG. 1 (a) and FIG. 1 (b) are flowcharts of the operations of a conventional magnetic disk processing apparatus.
Figure 1:
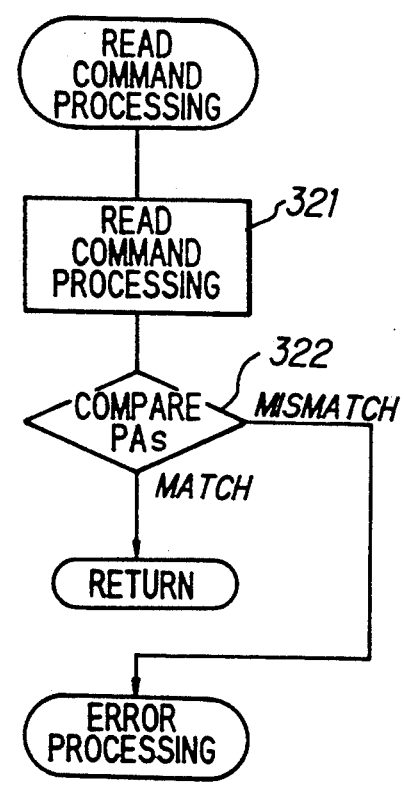
Figure 2:
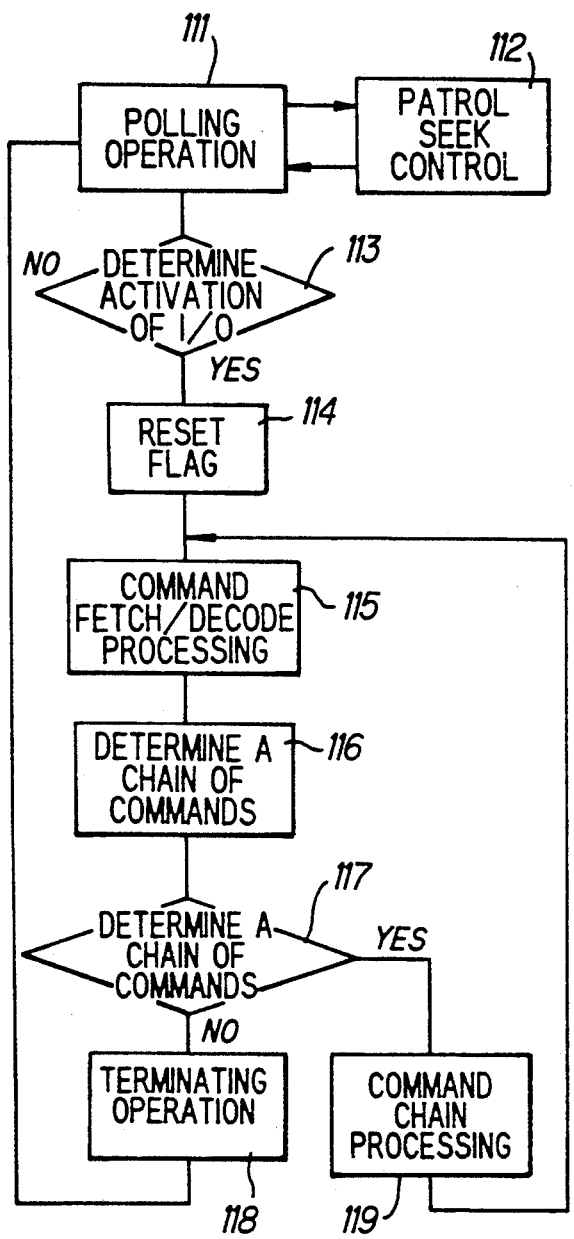
FIG. 2 is a main flowchart of the seek system of a magnetic disk processing apparatus according to the present invention.
Figure 6:
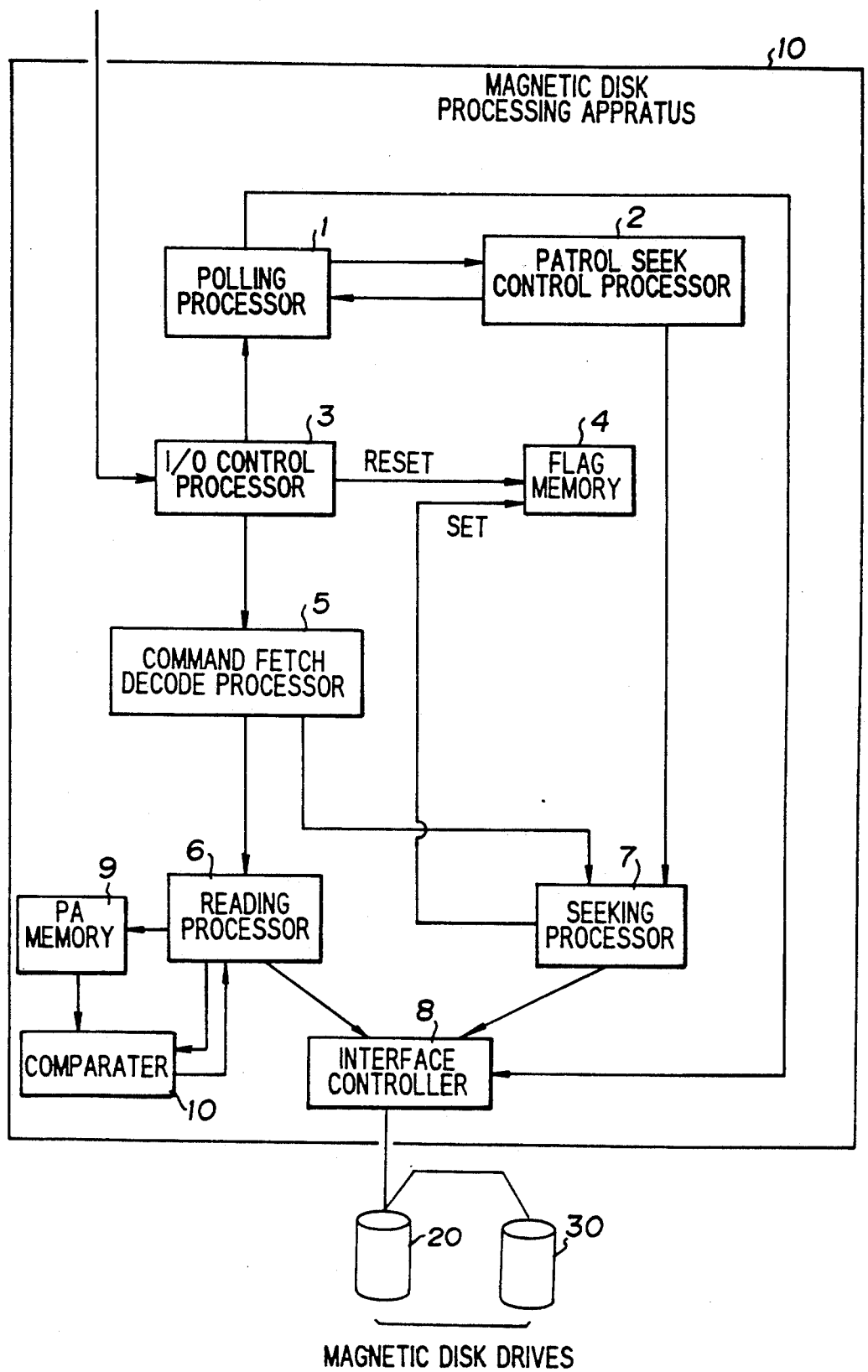
FIG. 6 is a block diagram of an embodiment of a magnetic disk processing apparatus according to the present invention.

A specific embodiment of the present invention is described with reference to FIGS. 2 and 6.

A magnetic disk processing apparatus 11 monitors the condition of the magnetic disk drives 20 and 30 through an interface controller 8. A polling processor 1 controls time period for a patrol seek and carries out a polling operation (step 111). The patrol seek function is a function in which the magnetic head is moved periodically for a predetermined period independently of access by the system. As a result of this function, the magnetic head does not stay in the same place even if a seek command is not generated for a long time. The patrol seek function prevents formation of uneven piles of microdust using a self-cleaning operation resulting from movement of the magnetic head. A patrol seek control processor 2 carries out a patrol seek control for each period of time (step 112) so as to supply with a patrol seek command and seek distance to a seeking processor 7. If an I/O control processor 3 receives a command from a computer (step 113), the processor 3 resets or initialize a flag memory 4 (step 114) prior to the execution of seek or read operation carried out by a command fetch/decode processor 5.

Next, the operation is transferred to the command fetch/decode processor 5 (step 115) and, in accordance with the actual software command, the processor 5 carries out the execution of the command such as seek operation or read/write operation by means of the seeking processor 7 or a reading processor 6 (step 116).

Thereafter, the I/O processor 3 detects whether or not the command chain CC is present (step 117), if any, after the CC processing or the terminating operation is executed (steps 119 and 118), the procedure is returned to the command fetch/decode operation by processor 5 or the polling operation by the processor 1 (step 115 or 111).

Figure 3:
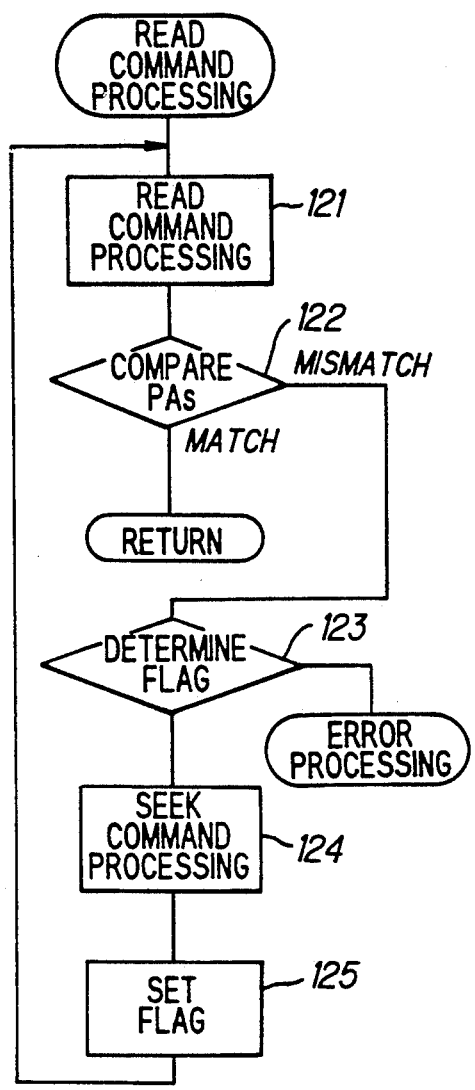
FIG. 3 is a flowchart of a read command processing subroutine in the command processing operation of FIG. 2.

FIG. 3 is a branching flowchart for the embodiment of the present invention, and part of a subroutine of the command executing operation 116, the subroutine being for processing the read command in accordance with the software command from the computer. In this case, the computer requests to read data without changing the target track on which the magnetic head was previously positioned.

First, a read command is issued to instruct reading of data to one of the magnetic disk drives 20 and 30 (step 121) from the same track on which the magnetic head was positioned in the previous seek and read operations.

Next, the reading processor 6 detects an actual physical address (PA) in the data read from the target track. A PA memory 9 stores a previous PA in order to indicate the position where the magnetic head was positioned by the previous software command in a seek command subroutine, which will be described later. The actual PA and stored PA are compared with each other in the PA comparing operation (step 122) by means of a comparator 10. Usually, the results of comparison coincide with each other. In that case, the processing is returned to the command executing portion, and the processing of the software command is continued.

However, prior to the execution of the command chain being executed, the patrol seek operation is conducted and, unless the magnetic head is located on a predetermined target track, a mismatch of the comparator 10 can take place there. In this case, the content of the flag memory 4 is detected (at this point, the flag memory 4 is reset) by the I/O control processor 4 (step 123). If the flag memory 4 is in a reset condition, a seek command is issued to position the magnetic heads at a target cylinder indicated by the stored PA (the position where the magnetic head is to be originally located) independently of the software command (step 124). Subsequently, the seeking processor 7 sets the flag memory 4 for indicating that the seek command derived from the mismatch of the PA comparison results has been completed (step 125) to carry out the read command processing 121 again.

Therefore, in the present embodiment, the set condition of the flag memory 4 means that the apparatus 11 has excited the seek operation for positioning the magnetic head at a position indicated by the PA memory 9, after the mismatch in the PA comparisons has been detected by the comparator 10.

In the following PA comparison 122, the PA comparison results should coincide with each other in principle. However, should it be detected that they do not coincide, then it is determined that the magnetic disk drive 20 and 30 broke down by branching from the flag determining operation 123 to the error.

Figure 4:
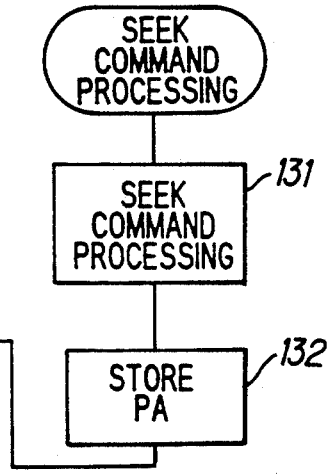
FIG. 4 is a flowchart of a seek command processing subroutine in the read command processing of FIG. 3.

FIG. 4 is part of the subroutine of the command executing operation 116, and is a seek command processing subroutine of the read command processing by the software command from the computer.

Referring to FIG. 4, after the seek command is issued to the magnetic disk drives 20 and 30 (step 131), the cylinder number and the track number of the magnetic disk are stored into the PA memory 9 for indicating the original position of the magnetic heads by the PA storing operation (step 132) and, then return the processing to the command execution processing 116.

Figure 5:
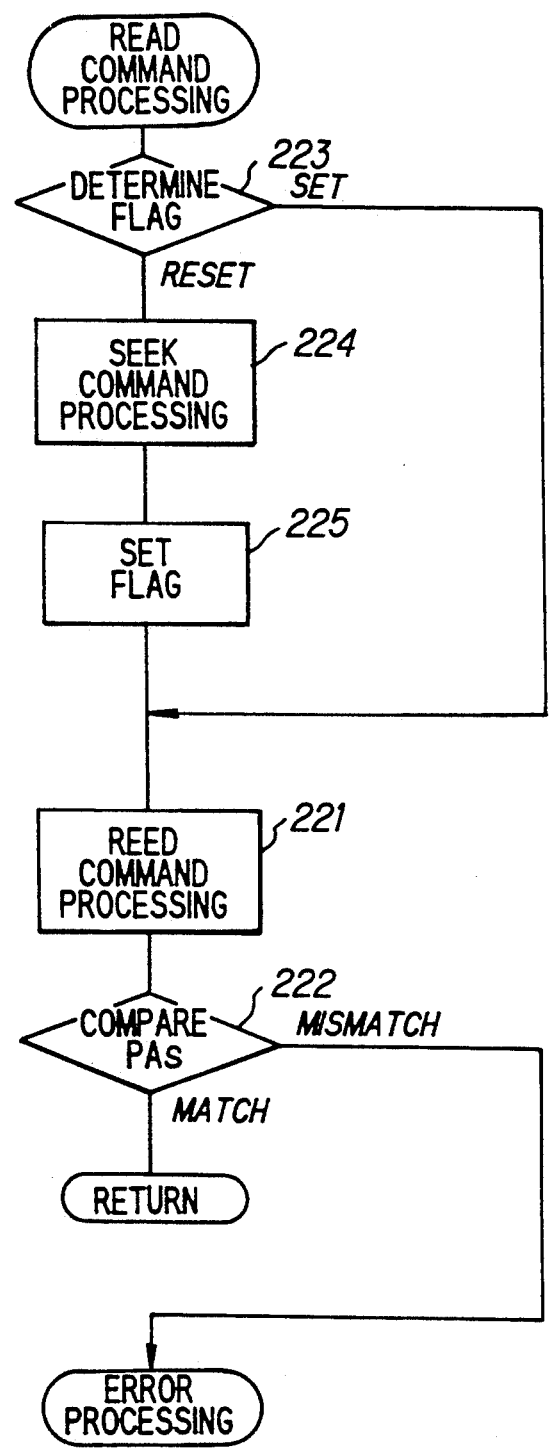
FIG. 5 is a flowchart of a flag determining subroutine in the read command processing of FIG. 3.

FIG. 5 is a flowchart illustrating a second embodiment of the present invention, which differs in the significance of the flag and in the operation of the read command processing subroutine illustrated in FIG. 3. In this case, only when the first read command of the CC from the software is received, the flag is used in order to issue the seek command to the stored PA.

First, when the magnetic disk processing apparatus sequentially processes the command from the software and first calls the read command processing subroutine, the seek command processing and the flag set processing are executed (steps 224 and 225) by the flag determining because the flag is naturally reset (step 223). Thereafter, while the command chain CC continues, it is determined by the determination of the flag determining operation that the flag is set (step 223), and the seek command processing 224 and the flag set operation 225 are bypassed, and the read command processing is executed (step 221). Also in this case, since the seek command issued to the predetermined position has been completed when the first read command is processed, in the next PA comparing operation, the comparison results should coincide with each other and, should they not coincide, as in the case of FIG. 3, it is determined that the magnetic disk apparatus broke down to carry out the error processing (step 222). In this manner, the seek error caused by the PA mismatch when the patrol seek is conducted can be completely compensated for.

What is claimed is:

1. A method for controlling a magnetic disk apparatus having a patrol seek function to issue a command thereto to shift a magnetic head at predetermined time and distance intervals independently of a software command, said method comprising the steps of:
    monitoring a condition of the magnetic disk and controlling a timer for patrol seeking to execute a polling operation;
    controlling a patrol for each predetermined period of time set by a timer set by said polling operation;
    performing an I/O activation determining operation to determine whether or not an I/O activation, which is an instruction for executing a chain of software commands, is present;
    initializing a flag indicating a condition in which a seek command is executed prior to execution of said I/O activation;
    carrying out a fetch/decode operation of a software command according to determined results of said I/O activation determining operation; and
    executing an actual software command decoded by said fetch/decode operation.

2. A method as set forth in claim 1, wherein said step of executing an actual software command comprises the steps of:
    reading data from said magnetic disk apparatus using software;
    comparing a physical address of data read out from said magnetic disk apparatus by said reading data operation with a physical address indicating a position where the magnetic head is shifted in accordance with a seek command;
    determining a condition of said flag when results of physical address comparing do not coincide with each other;
    determining as an error operation if a result of a flag determining operation is set and issuing a seek command to a physical address being stored independently of the software command to correct a seek error if the result is reset; and
    setting a flag indicating that a seek operation has been completed by a seek command operation to return processing again to read command processing.

3. A method as set forth in claim 2, wherein read command processing is carried out by determining the flag only when a first read command is issued, processing the seek command and resetting the flag after it is confirmed that the flag has been reset, and determining a period of time during which a following command chain continues to bypass seek command processing and flag set operations.

4. A method as set forth in claim 1, wherein a branching operation of seek command processing is carried out by storing a cylinder number and a track number of a corresponding position as a physical address indicating an original position of the magnetic head after a seek operation is conducted in accordance with a seek command.

* * * * *

UNITED STATES PATENT AND TRADEMARK OFFICE
CERTIFICATE OF CORRECTION

PATENT NO. : 5,307,489
DATED : April 26, 1994
INVENTOR(S) : YAMAZAKI

It is certified that error appears in the above-indentified patent and that said Letters Patent is hereby corrected as shown below:

On the title page, item [54] and column 1, line 3, insert "PROCESSING" before "APPARATUS".

Signed and Sealed this

Twenty-third Day of May, 1995

Attest:

BRUCE LEHMAN

*Attesting Officer*          *Commissioner of Patents and Trademarks*